Patented June 14, 1938

2,120,322

UNITED STATES PATENT OFFICE 2,120,322

PROCESS FOR PREPARING PSEUDO-CYANINE DYES

Bernard Beilenson, Harrow Weald, England, assignor, by mesne assignments, to Eastman Kodak Company, Jersey City, N. J., a corporation of New Jersey No Drawing. Application November 20, 1934, Serial No. 753,925. In Great Britain December 19, 1933

4 Claims. (Cl. 260—41)

This invention relates to a process for the preparation of 2'-cyanine, i. e. pseudocyanine dyes and in particular to a process wherein the basic condensing agent is an inexpensive salt, which gives rise to an alkaline reaction.

In the prior processes for the preparation of pseudocyanine dyes, wherein a basic material is added to the reaction mixture to effect the condensation, the basic materials which have been employed are (1) an alcoholic or aqueous solution of potassium hydroxide, (2) an alcoholic solution of sodium ethylate and (3) a strong organic base, such as triethylamine. Triethylamine has been particularily satisfactory. However, its cost has lessened its extensive use. Now I have discovered that comparatively inexpensive salts, which give rise to an alkaline reaction, are satisfactory basic materials to add to the reaction mixture in order to effect a cyanine dye condensation.

An object, therefore, of this invention is to provide a process for the preparation of pseudocyanine dyes wherein a salt, which gives rise to an alkaline reaction, is the basic condensing agent. Other objects will appear hereinafter.

Salts which I have found useful in my process described herein can be defined further as salts of strong bases such as sodium and potassium hydroxide with weak acids such as carbonic, orthophosphoric and tetraboric acid. By the term weak acid, I mean an inorganic acid whose dissociation constant, in water, is not greater than $5 \times 10^{-7}$ at 18° C. By the term strong inorganic base, I mean a hydroxide of a metal of the alkali metal group.

A typical pseudocyanine dye condensation, wherein a salt such as has been indicated above is the basic condensing agent, can be illustrated by the following equation:

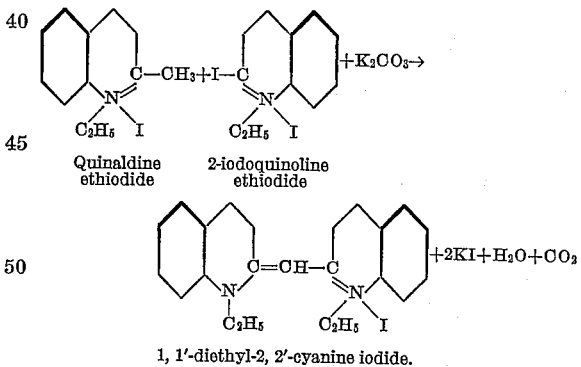

Quinaldine ethiodide   2-iodoquinoline ethiodide 1, 1'-diethyl-2, 2'-cyanine iodide.

The basic condensing agent, potassium carbonate, functions to bind the elements of hydriodic acid eliminated from the condensing molecules and hence to effect the condensation.

In carrying out a process such as indicated above, the reactants which go to make up the dye are dispersed in a lower aliphatic alcohol, preferably absolute ethyl alcohol, the basic condensing agent is added and the whole is heated for a short time or the reaction mixture is allowed to stand for a long time at ordinary temperatures. After a short period of heating, the reaction mixture is allowed to cool. The dye crystals which then separate are filtered off, washed with water to remove the inorganic salts and dried.

The salts thus added to the reaction mixture should be anhydrous and in a finely divided state, for best results. Particles which pass an 180 mesh screen are satisfactory.

In addition to the advantage that the salts of the type stated above are generally inexpensive, an important advantage of these salts as basic condensing agents in pseudocyanine dye condensations lies in the fact that an excess of the salts (more than is required to bind the elements of acid eliminated from the condensing molecules) is harmless to the reaction. It is well known that an excess of sodium ethylate influences such condensations adversely, more than one reaction product usually being obtained under such conditions. When salts such as I have described are the condensing agents, a single reaction product and a high yield generally obtain, even though the salt is in excess.

These salts of strong bases and weak acids, which give rise to an alkaline reaction, can function as the condensing agent in any cyanine dye condensation wherein a basic condensing agent is required to bind the elements of acid eliminated from the condensing molecules. To illustrate the breadth of this invention examples of the preparation of 2'-cyanine i. e. pseudocyanine dyes, are given below.

*Example 1.—1,1'-Diethyl-2,2'-cyanine iodide*

0.5 g. of 2-iodoquinoline ethiodide, 0.36 g. of quinaldine ethiodide, 0.21 g. of anhydrous potassium carbonate (180 mesh) and 20 cc. of absolute ethyl alcohol were heated at 100° C. with rapid stirring for about one-half hour. The deeply colored solution was cooled, the crystals of crude dye filtered off and washed with water to remove inorganic salts and dried. The yield of crude dye was higher by 15% than that obtained using alcoholic potassium hydroxide as the condensing agent.

*Example 2.—1',2-Diethylthia-2'-cyanine iodide*

0.5 g. of 2-iodoquinoline ethiodide, 0.38 g. of 1-methylbenzothiazole ethiodide, 0.21 g. of anhydrous potassium carbonate (180 mesh) and 25 cc. of absolute ethyl alcohol were treated as in Example 1. The yield of crude, washed dye was 27% higher than that obtained using sodium ethylate and 16% higher than that obtained using triethylamine.

*Example 3.—1',2-Diethyl-5',6'-benzoselena-2'-cyanine iodide*

0.7 g. of 1-methylbenzoselenazole ethiodide, 0.92 g. of 2-iodo-β-naphthoquinoline (2-iodo-5,6-benzoquinoline) ethiodide, 0.33 g. of anhydrous potassium carbonate (180 mesh) and 15 cc. of absolute ethyl alcohol were treated as in Example 1. The product was recrystallized from methyl alcohol. The yield of recrystallized dye was 33% higher than that obtained when sodium ethylate is employed.

*Example 4.—1',2-Diethyl-5,6,5',6'-dibenzothia-2'-cyanine iodide*

0.36 g. of 1-methyl-β-napthothiazole ethiodide, 0.46 g. of 2-iodo-β-naphthoquinoline (2-iodo-5,6-benzoquinoline) ethiodide, 0.17 g. of anhydrous potassium carbonate (180 mesh) and 15 cc. of absolute ethyl alcohol were treated as in Example 1, and the product was recrystallized from methyl alcohol. The yield of recrystallized product was 9% higher than that obtained when triethylamine was used.

*Example 5.—1'-Ethyl-3-methylthiazolino-2'-cyanine iodide*

0.42 g. of 2-methylthiazoline methiodide, 0.82 g. of 2-iodoquinoline ethiodide, 0.34 g. of anhydrous potassium carbonate (180 mesh) and 30 cc. of absolute ethyl alcohol were treated as in Example 1. The yield of dye recrystallized from methyl alcohol was about 48%.

*Example 6.—1'-Ethyl-3,4,dimethylthiazolo-2'-cyanine iodide*

0.26 g. of 2,4-dimethylthiazole methiodide, 0.41 g. of 2-iodoquinoline ethiodide, 0.17 g. of anhydrous potassium carbonate and 15 cc. of absolute ethyl alcohol were treated as in Example 1. The yield of pure dye after recrystallization from methyl alcohol was about 31% of the theoretical.

*Example 7.—1',2-Diethyloxa-2'-cyanine iodide*

0.35 g. of 1-methylbenzoxazole ethiodide, 0.5 g. of 2-iodoquinoline ethiodide, 0.21 g. of anhydrous potassium carbonate (180 mesh) and 20 cc. of absolute ethyl alcohol were treated as in Example 1. The yield of the pure dye recrystallized from methyl alcohol equals that obtained when triethylamine was used.

*Example 8.—1'-Ethyl-1,3,3-trimethylindo-2'-cyanine iodide*

1.0 g. of 2,3,3-trimethylindolenine methiodide, 1.37 g. of 2-iodoquinoline ethiodide, 0.65 g. of anhydrous carbonate (180 mesh) and 20 cc. of absolute ethyl alcohol were treated as in Example 1. The recrystallized dye was obtained in a yield of about 43% of the theoretical.

*Example 9.—1',2-Diethylthia-2'-cyanine iodide*

3.08 g. of 2-iodoquinoline ethiodide, 2.18 g. of 1-methylbenzothiazole ethiodide, 0.95 g. of anhydrous sodium carbonate (180 mesh) and 25 cc. of absolute ethyl alcohol were treated as in Example 1. The yield of pure dye recrystallized from methyl alcohol was 56% of the theoretical.

*Example 10.—1,1'-Diethyl-2,2'-cyanine iodide*

0.5 g. of 2-iodoquinoline ethiodide, 0.36 g. of quinaldine ethiodide, 0.28 g. of anhydrous borax (180 mesh) and 20 cc. of absolute ethyl alcohol were treated as in Example 1. The yield of pure dye, recrystallized from methyl alcohol, was about 43%.

*Example 11.—1,1'-Diethyl-2-pyrido-2'-cyanine iodide*

0.5 g. of α-picoline ethiodide, 0.82 g. of 2-iodoquinoline ethiodide, 0.34 g. of anhydrous potassium carbonate (180 mesh) and 20 cc. of absolute ethyl alcohol were treated as in Example 1. The yield of pure dye recrystallized from methyl alcohol was about 16% of the theoretical.

*Example 12.—1'-Ethyl-1,5-dimethylpyrazino-2'-cyanine iodide*

0.25 g. of 2,5-dimethylpyrazine methiodide, 0.36 g. of 2-iodoquinoline ethiodide and 4 cc. of absolute ethyl alcohol were treated as in Example 1 with (a) 0.05 g. of sodium in 3 cc. of absolute ethyl alcohol, (b) 0.2 g. of triethylamine, (c) 0.16 g. of anhydrous potassium carbonate (180 mesh). The yields of pure dye recrystallized from methyl alcohol were 24%, 62% and 48%, respectively.

From the foregoing examples, it is clear that the yields obtained when employing salts of strong inorganic bases and weak acids are superior to those obtained when condensing agents such as sodium ethylate are employed. In certain cases, the yields obtained when employing alkali carbonates as condensing agents compare favorably with those obtained when triethylamine is employed as the condensing agent.

By the terms "2'-cyanine dye" or "pseudocyanine dye" I mean a cyanine dye having a quinoline nucleus linked through its alpha position by one methenyl group to a heterocyclic nucleus containing a nuclear nitrogen atom through its position alpha to the nuclear nitrogen atom. As shown in the above examples, the nuclei can be substituted, for instance the quinoline nucleus can carry a fused-on benzene ring, as in benzoquinoline.

What I claim as my invention and desire to be secured by Letters Patent of the United States is:

1. In the process for the preparation of a pseudocyanine dye wherein a cyclammonium alkiodide containing a reactive methyl group in the alpha position to the quinquevalent nitrogen atom is condensed with a quinoline alkiodide containing a reactive iodine atom in the alpha position to the quinquevalent nitrogen atom, the condensation being effected in the presence of a basic condensing agent to bind the elements of acid eliminated from the condensing molecules, the step comprising employing an alkali metal carbonate as basic condensing agent.

2. In the process for the preparation of a pseudocyanine dye wherein a cyclammonium alkiodide containing a reactive methyl group in the alpha position to the quinquevalent nitrogen atom is condensed with a quinoline alkiodide containing a reactive iodine atom in the alpha position to the quinquevalent nitrogen atom, the condensation being effected in the presence of a basic condensing agent to bind the elements of acid eliminated from the condensing molecules, the step comprising employing potassium carbonate as basic condensing agent.

3. In the process for the preparation of a pseudocyanine dye wherein a 1-methylbenzothiazole alkiodide is condensed with a 2-iodoquinoline alkiodide, the condensation being effected in the presence of a basic condensing agent to bind the elements of acid eliminated from the condensing molecules, the step comprising employing an alkali metal carbonate as basic condensing agent.

4. In the process for the preparation of a pseudocyanine dye wherein a 1-methylbenzothiazole alkiodide is condensed with a 2-iodoquinoline alkiodide, the condensation being effected in the presence of a basic condensing agent to bind the elements of acid eliminated from the condensing molecules, the step comprising employing potassium carbonate as basic condensing agent.

BERNARD BEILENSON.